United States Patent
Kadota et al.

(10) Patent No.: US 10,507,457 B2
(45) Date of Patent: Dec. 17, 2019

(54) HONEYCOMB STRUCTURE AND METHOD FOR MANUFACTURING THE SAME

(71) Applicant: DENSO CORPORATION, Kariya, Aichi-pref. (JP)

(72) Inventors: Youichi Kadota, Kariya (JP); Yasushi Takayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 113 days.

(21) Appl. No.: 15/579,660

(22) PCT Filed: Apr. 20, 2016

(86) PCT No.: PCT/JP2016/062524
§ 371 (c)(1),
(2) Date: Dec. 5, 2017

(87) PCT Pub. No.: WO2016/199505
PCT Pub. Date: Dec. 15, 2016

(65) Prior Publication Data
US 2018/0169626 A1  Jun. 21, 2018

(30) Foreign Application Priority Data

Jun. 8, 2015 (JP) .................................. 2015-116105

(51) Int. Cl.
| | |
|---|---|
| *B01J 23/83* | (2006.01) |
| *B01J 35/04* | (2006.01) |
| *C04B 35/50* | (2006.01) |
| *B01D 53/94* | (2006.01) |
| *B01J 23/00* | (2006.01) |

(52) U.S. Cl.
CPC ............ *B01J 23/83* (2013.01); *B01D 53/945* (2013.01); *B01J 23/002* (2013.01); *B01J 35/04* (2013.01); *C04B 35/50* (2013.01)

(58) Field of Classification Search
CPC ........ B01D 46/2418; B01D 2253/3425; B01D 46/2451; B01D 53/945; B01J 35/04; B01J 20/28045; B01J 23/83; B01J 23/002; B01J 32/00; F01N 3/2828; F01N 2330/06; F01N 3/0222; C04B 35/488; C04B 35/50; C04B 2235/6562; C04B 2235/405; C04B 2235/3217; C04B 2235/322; C04B 2235/40; C04B 2235/448
See application file for complete search history.

(56) References Cited

U.S. PATENT DOCUMENTS

2009/0247395 A1  10/2009  Kunieda et al.
2010/0221160 A1* 9/2010  Adib ................. B01D 53/9418
                                                     423/213.2

FOREIGN PATENT DOCUMENTS

JP          04-074761        3/1992

* cited by examiner

*Primary Examiner* — Anthony J Zimmer
(74) *Attorney, Agent, or Firm* — Nixon & Vandherhye PC

(57) ABSTRACT

The present invention relates to a honeycomb structure having promoter particles and a binder phase interposed between the promoter particles, and a method for manufacturing the same. The promoter particles contain at least first promoter particles made of a ceria-zirconia solid solution. The binder phase, in each of which a number of inorganic binder particles are aggregated with each other, with α-alumina being a main component, contain one or two of Fe and Cr dissolved in α-alumina. The honeycomb structure has a specific surface area at a ratio of 90% or more of after heating to before heating at a temperature of 1200° C.

4 Claims, 3 Drawing Sheets

HONEYCOMB STRUCTURE AND METHOD FOR MANUFACTURING THE SAME

This application is the U.S. national phase of International Application No. PCT/JP2016/062524 filed Apr. 20, 2016 which designated the U.S. and claims priority to JP Patent Application No. 2015-116105 filed Jun. 8, 2015, the entire contents of each of which are hereby incorporated by reference.

TECHNICAL FIELD

This invention relates to a honeycomb structure made up of promoter particles and inorganic binder particles and to a method for manufacturing the same.

BACKGROUND ART

In order to purify automobile exhaust gases, honeycomb structures of conventional techniques are made of cordierite, SiC, or the like. Specifically, these honeycomb structures uses exhaust gas purifying catalysts. Such an exhaust gas purifying catalyst includes an inorganic binder carrying a promoter made of a ceria-zirconia solid solution or the like and a noble metal catalyst.

Recently, honeycomb structures made of a promoter component or the like have been under development. However, when honeycomb structures are constructed using a promoter component, there is a problem that the promoter particles are not completely bonded to each other and thus the strength of the honeycomb structure is insufficient. As measures against this, there are proposed honeycomb structures made of ceria particles, a ceramic material having lower self-sintering performance than ceria particles, and an inorganic binder (refer to PTL 1).

CITATION LIST

Patent Literature

[PTL 1] JP 5185837 B

SUMMARY OF THE INVENTION

Technical Problem

However, honeycomb structures made of a promoter component such as ceria still have room for improvement at a higher level in both the strength and the specific surface area. That is, in order to secure sufficient strength of such a honeycomb structure, it is desirable that the promoter particles are strongly bonded through an inorganic binder made of sintered alumina or the like. Specifically, for example, an inorganic binder (e.g. alumina) may be sintered at 1200° C. or more for sufficient thermal decomposition. With this thermal decomposition, the promoter particles are bonded to each other with sufficiently high strength through the inorganic binder, thereby improving the strength of the honeycomb structure. However, during high temperature sintering, heat generated from the inorganic binder transfers to the promoter particles as the inorganic binder is thermally decomposed to thereby inevitably progress sintering of the promoter particles. Therefore, high temperature sintering raises a problem of melting the promoter particles and thus decreasing the specific surface area of the honeycomb structure. In this regard, low temperature sintering of a honeycomb structure can reduce decrease in the specific surface area of the honeycomb structure. However, low temperature sintering cannot sufficiently thermally decompose an inorganic binder and thus cannot strongly bond the promoter particles to each other, whereby the strength of the honeycomb structure inevitably decreases.

The present invention has been made in view of such background, and provides a honeycomb structure having a specific surface area and a strength larger than a given level and a method for manufacturing the same.

Means for Solving the Problems

One aspect of the present invention is a honeycomb structure made up of promoter particles and a binder phase. The promoter particles include at least first promoter particles made of a ceria-zirconia solid solution. In addition, the binder phase is disposed between the promoter particles, and is formed by aggregating mutually a plurality of inorganic binder particles composed of mainly $\alpha$-alumina. The binder phase includes Fe and/or Cr dissolved in $\alpha$-alumina and a ratio of the specific surface area after heating to before heating at 1200° C. is 90% or more.

Another aspect of the present invention is a manufacturing method of the honeycomb structure. The manufacturing method of the honeycomb structure includes a mixing step for obtaining clay that is a source of the honeycomb structure, a molding step for molding the clay and a sintering step for sintering the molded clay. Specifically, in the mixing step, the clay is obtained by mixing the promoter particles, inorganic binder materials made of alumina sol and a sintering assistant solution made of a solution of a salt of Fe and/or Cr. In this step, a molding is obtained by molding the clay into the honeycomb shape. In the sintering step, the molding is sintered at 1100° C. or less. In the mixing step, the sintering assistant solution is added to the promoter particles and Fe and/or Cr such that an addition amount of Fe and/or Cr relative to 100 parts by mass of the promoter particles is set to be 1.4 parts or less in terms of an oxide.

Advantageous Effects of the Invention

The honeycomb structure is made up of the promoter particles and the binder phase disposed between the promoter particles. The binder phase is formed by aggregating mutually the inorganic binder particles composed of mainly $\alpha$-alumina. In other words, the binder phase is formed by sintering the inorganic binder particles sufficiently. Therefore, the honeycomb structure can have sufficient strength.

In addition, in the honeycomb structure, it is possible that to sinter the binder phase at a low temperature because the binder phase includes Fe and/or Cr dissolved in $\alpha$-alumina. In addition, in the honeycomb structure, as described above, the ratio of the specific surface area after heating to before heating at 1200° C. is 90% or more. This means that the honeycomb structure is sintered at the low temperature. In addition, in the honeycomb structure, the binder phase is sufficiently thermal decomposed, even when a sintering temperature is low in the presence of the above-described Fe and/or Cr. Then, the binder phase bonds with the promoter particles at sufficient high strength. In addition, reduction of the specific surface area is suppressed because sintering the promoter particles is reduced by sintering at the low temperature. Accordingly, the honeycomb structure has the specific surface area and the strength larger than the given level.

The honeycomb structure is manufactured by performing, for example, the mixing step, the molding step and the sintering step. In the mixing step, the clay is produced using the promoter particles, the inorganic binder materials and the sintering assistant solution. In the molding step, as described above, the molding is obtained by molding the clay into the honeycomb shape. Next, in the sintering step, the molding is sintered at a low temperature of 1100° C. or less. Progressing of sintering of the promoter particles may be reduced because the honeycomb structure is sintered at such a low temperature. Therefore, the reduction of the specific surface area may be suppressed. Furthermore, in the mixing step, the inorganic binder materials are sufficiently thermal decomposed even at a low sintering temperature of 1100° C., because using the sintering assistant solution. Therefore, the binder phase with excellent strength made up of the inorganic binder particles made of α-alumina is formed. Therefore, it is possible to manufacture the honeycomb structure having the specific surface area and the strength larger than the given level.

DESCRIPTION OF THE EMBODIMENTS

Figure 1:
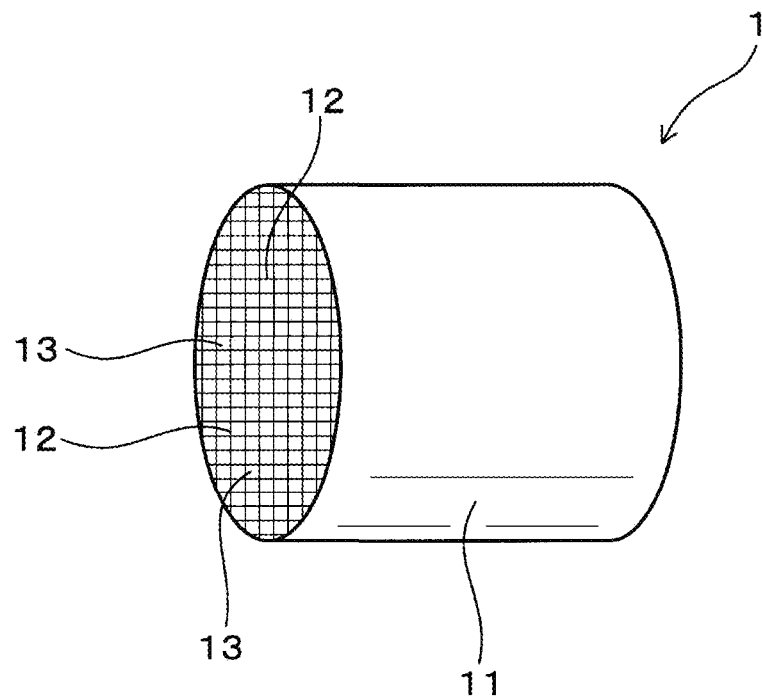
FIG. 1 shows a perspective view of a honeycomb structure manufactured under conditions of a first embodiment.

Next, preferable embodiments of a honeycomb structure and a method for manufacturing the same will be described below. The honeycomb structure can carry a ternary catalyst containing at least one noble metal selected, for example, from Pt, Rh, Pd. Carrying such a ternary catalyst, a honeycomb structure, when it contains promoter particles, can improve the catalyst purification performance of the ternary catalyst. The promoter particles contain at least first promoter particles made of a ceria-zirconia solid solution obtained by dissolving zirconium into ceria. In the concept of the present specification, the ceria-zirconia solid solution may include a solid solution obtained by dissolving not only zirconium but also rare earth elements, such as La and Y, into ceria.

The honeycomb structure is made up of, for example, a cylindrical outer skin, porous partition walls, and a plurality of cells. The porous partition walls are arranged in a grid pattern, for example, in the outer skin. The plurality of cells are formed so as to be surrounded by the partition walls, and extend in the axial direction of the honeycomb structure. A polygon such as a triangle, a tetragon, a hexagon, an octagon or the like. The cells may have a circular shape. The overall honeycomb structure may have, for example, a shape of circular cylinder or polygonal cylinder, or any other cylindrical shape. The outer skin may have, for example, a shape of circular cylinder or polygonal cylinder, or any other cylindrical shape in conformity with the overall shape of the honeycomb structure. A plurality of honeycomb structures may be bonded to each other via their outer skins for integration to thereby form a honeycomb structure.

A honeycomb structure is made up of promoter particles and a binder phase in each of which inorganic binder particles are aggregated with each other. The blending ratio of the promoter particles to the inorganic binder particles can be properly adjusted. The contents of the inorganic binder particles is preferably 1 to 30 parts by mass relative to 100 parts by mass of the promoter particles. In this case, the honeycomb structure can have a specific surface area and a strength improved at an even higher level. In addition, the catalyst purification performance may be sufficiently raised when the honeycomb structure is permitted to carry a ternary catalyst. The content of the inorganic binder particles is more preferably 3 to 20 parts by mass, and even more preferably 5 to 15 parts by mass relative to 100 parts by mass of the promoter particles. The honeycomb structure preferably contains the ceria-zirconia solid solution as a main component to sufficiently achieve an advantageous effect of imparting promoter performance to the honeycomb structure.

The particle size ratio of the inorganic binder particles to the first promoter particles is preferably 1/100 or less, and more preferably 1/500 or less. In this case, the strength of the honeycomb structure may be increased because the inorganic binder particles are easily placed between the promoter particles. The particle size ratio refers to a ratio of an average particle size $D_1$ of the first promoter particles to an average particle size $D_2$ of the inorganic binder particles ($D_2/D_1$). The average particle size refers to particle size based on a volume integrated value of 50% in a particle size distribution measured by a laser diffraction scattering method.

EXAMPLE

First Example

A honeycomb structure according to an example will be described below.

As shown in FIG. 1, a honeycomb structure 1 of the present example has a cylindrical shape in its entirety (φ103 mm diameter×L 105 mm length), and has a porous body including a cylindrical outer skin 11, cell partitions 12 and a number of cells 13. The cell partitions 12 are arranged in a square grid pattern on the inside of the outer skin 11. The number of the cells 13 are defined by the cell partitions 12. The honeycomb structure 1 has a cell density of 600 cpsi, and the cell partitions 12 has a thickness of 80 μm.

Figure 2:
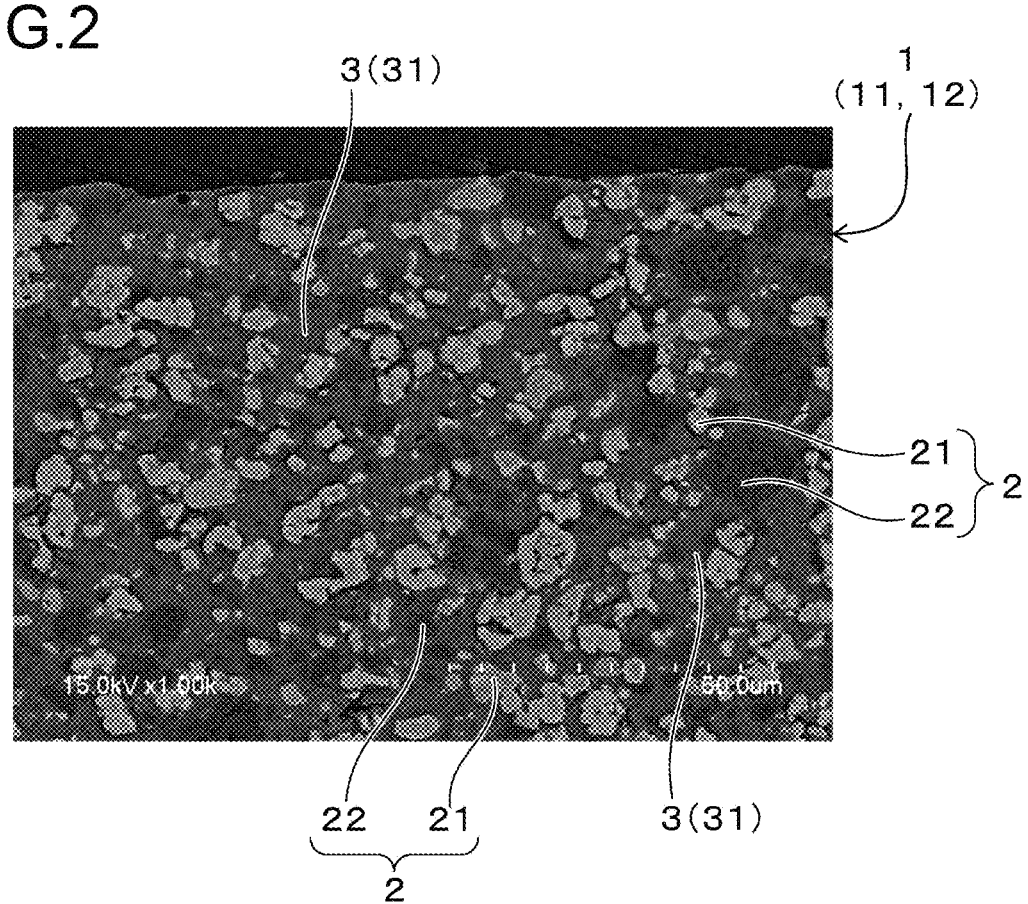
FIG. 2 shows an image of a cross section of the honeycomb structure manufactured under conditions of the first embodiment captured by an electron scanning microscope.

As shown in FIG. 2, the honeycomb structure 1, or more specifically, the outer skin 11 and the cell partitions 12, are made up of a number of promoter particles 2 and a binder phase 3 interposed between the promoter particles 2. Each promoter particle 2 contains a first promoter particle 21 made of a ceria-zirconia solid solution and a second promoter particle 22 made of θ-alumina. The first promoter particle 21 and the second promoter particle 22 are each made of a secondary particle in which a number of primary particles are aggregated with each other. In the binder phase 3, a number of fine inorganic binder particles 31 are aggregated with each other, with α-alumina being a main component. Each inorganic binder particle 31 has a nano-order size, and thus is too small in the image acquired by a scanning electron microscope (SEM) shown in FIG. 2 to confirm the shape. The binder phase 3 contains a small amount of Fe, which is dissolved in a part of α-alumina. In FIG. 2, the darkest gray areas represent the second promoter particles 22, and the lightest gray areas represent the first promoter particles 21. Gray areas with a density intermediate of the darkest gray areas and the lightest gray areas represent the binder phase 3.

The binder phase 3 is a bonding agent bonding between the promoter particles 2 (specifically, the first promoter particle 21 and the second promoter particle 22). The honeycomb structure 1 is porous, with a fine space being formed between the particles 21, 22 and 31.

A manufacturing method of the honeycomb structure of the present example will be described below. In the present example, the honeycomb structure was manufactured through a mixing step, a molding step and a sintering step.

[Mixing Step]

First, liquid mixture was prepared by mixing an inorganic binder material made of alumina sol (e.g. AS520 manufactured by Nissan Chemical Industries, Ltd.) and an iron nitrate (II) solution. Then, the first and the second promoter particles, an organic binder, a molding aid and water were added to the liquid mixture, followed by kneading the mixture for 90 minutes using a kneader to obtain a clay. The first promoter particles having an average particle size 10 μm were made of a ceria-zirconia solid solution. The first promoter particles having an average particle size 10 μm were made of a ceria-zirconia solid solution. The second promoter particles having an average particle size 20 μm were made of θ-alumina. The organic binder is formed of methyl cellulose (e.g. 65MP4000 manufactured by Matsumoto Yushi-Seiyaku Co., Ltd.). The molding aid was, for example, UNILUBE 50MB26 manufactured by NOF corporation. The kneader was, for example, MS pressure kneader DS3-10 manufactured by Moriyama INC. The mixing ratio of the first promoter particles to the second promoter particles was 70:30 (first promoter particles: second promoter particles) in terms of mass ratio. The amounts of materials of honeycomb structure are each expressed in terms of parts by mass relative to 100 parts by mass of the promoter particles (i.e. 100 parts by mass of the first promoter particles and the second promoter particles). The inorganic binder material (i.e. alumina sol in the present example) was blended at a ratio of 10 parts by mass in terms of solid content. A sintering assistant was blended at a ratio of 0.35 parts by mass in terms of oxide equivalent amount (i.e. in terms of $Fe_2O_3$ in the present example). The organic binder was blended at a ratio of 15 parts by mass, and similarly, the molding aid, 1 part by mass, and water, 33 parts by mass. The first promoter particles of the present example were made of a ceria-zirconia solid solution obtained by dissolving zirconium into ceria, and rare earth elements, such as La and Y, are also dissolved therein besides zirconium.

[Molding Step]

Next, clay was molded into a honeycomb shape by extrusion molding, with a molding pressure of 10 MPa, thereby obtaining a molding having a honeycomb shape. The molding had the same shape as the honeycomb structure 1 shown in FIG. 1. After that, the molding was sufficiently dried using a microwave dryer and a hot air dryer.

[Sintering Step]

Next, the molding was sintered in an electric furnace for 10 hours at 1050° C. to obtain a sintered molding, that is, the honeycomb structure 1 as shown in FIGS. 1 and 2. FIG. 2 described later shows an image of a cross section of the cell partitions 12 of the honeycomb structure 1 of the present example acquired using a scanning electron microscope (SEM). As the scanning electron microscope, a "Quanta FEG250" manufactured by FEI was used.

Next, the specific surface area of the honeycomb structure obtained in the present example was measured. Specifically, first, a part of the honeycomb structure was pulverized to obtain a pulverized powder. The specific surface area of the pulverized powder 0.1 g was measured with Brunauer-Emmett-Teller method (BET method) using a "TriStar II 3020" manufactured by Shimadzu Corporation. After the honeycomb structure was heated for 20 hours at 1200° C. in atmospheric air, the specific surface area of the honeycomb structure was measured in the same way as the above-described method to calculate a ratio of the specific surface area of the honeycomb structure after heating to before heating using the following formula (1). In the formula (1), $\Delta A$ is a change ratio of the specific surface area of the honeycomb structure, and $A_0$ is the specific surface area of the honeycomb structure before heating at 1200° C., and $A_1$ is the specific surface area of the honeycomb structure after heating at 1200° C. This results are shown in Table 1 described below.

$$\Delta A = 100 \times (A_0 - A_1)/A_0 \quad (1)$$

The strength of the honeycomb structure obtained in the present example was measured. Specifically, first, a test piece 3 mm×3 mm×10 mm was prepared from the honeycomb structure. Then, using an Autograph ("AG-X Plus" manufactured by Shimadzu Corporation), a compressive load was applied to the test piece in an extending direction of the cell (in a longitudinal direction of the test piece), and a breaking load (L) was measured. Then, using the measured value of the breaking load (L) and a cross-section area (S) of an essential part of the test piece, a strength (I) was calculated based on the following formula (2). The cross-section area of the essential part means an area obtained by subtracting an area of an opening part of the test piece from an area of a cross section of the test piece perpendicular to the longitudinal direction. 20 test pieces were prepared from the honeycomb structure and, for each of which, a strength of an arithmetic mean was calculated. The results are shown in Table 1.

$$I(\text{MPa}) = L/S \quad (2)$$

Second to Fifth Examples

The amounts of materials of honeycomb structure used in the following examples and comparative examples are each expressed in terms of parts by mass relative to 100 parts by mass of promoter particles (i.e. 100 parts by mass of first promoter particles and second promoter particles).

In a second example, a honeycomb structure was prepared in the same way as in the first example, except that the blending ratio of the inorganic binder material was changed to 5 parts by mass in terms of solid content.

In a third example, a honeycomb structure was prepared in the same way as in the first example, except that the blending ratio of the inorganic binder material was changed to 15 parts by mass in terms of solid content.

In a fourth example, a honeycomb structure was prepared in the same way as in the first example, except that the blending ratio of the sintering assistant was changed to 0.7 parts by mass in terms of oxide equivalent amount.

In a fifth example, a honeycomb structure was prepared in the same way as in the first example, except that the blending ratio of the sintering assistant was changed to 1.4 parts by mass in terms of oxide equivalent amount.

In each of the second to fifth examples, a specific surface area $A_0$, a changing ratio $\Delta A$ of the specific surface area and a strength were measured in the same way as in the first example. The results are shown in Table 1.

First to Third Comparative Examples

In a first comparative example, a honeycomb structure was prepared in the same way as in the first example, except that no sintering assistant solution was used.

In a second comparative example, a honeycomb structure was prepared in the same way as in the first example, except that no sintering assistant solution was used and that the sintering temperature was changed to 1150° C.

In a third comparative example, a honeycomb structure was prepared in the same way as in the first example, except that the addition amount of the sintering assistant solution relative to 100 parts by mass of promoter particles was changed to 2.8 parts by mass in terms of oxide ($Fe_2O_3$) equivalent amount.

In each of the first to third comparative examples, a specific surface area $A_0$, a ratio $\Delta A$ of the specific surface area after heating to before heating, and a strength were measured. The results are shown in Table 1.

Comparison of First to Fifth Examples with First to Third Comparative Example

For each of honeycomb structures of the examples and the comparative examples, formulation of materials when manufactured, sintering conditions, and evaluations are shown in Table 1.

specific surface area after heating to before heating at 1200° C. was 90% or more. This means that the honeycomb structures 1 were sintered at the low temperature as described above. The binder phase 3 were sufficiently sintered in the presence of the above-described Fe even at such a low sintering temperature. In addition, alumina of the binder phase 3 was thermally decomposed, whereby the promoter particles 2 were bonded to each other with sufficiently high strength. On the other hand, since sintering of promoter particles was suppressed by the low sintering temperature, decrease of the specific surface area of the honeycomb structures were minimized. The ratio of the specific surface area of each honeycomb structure after heating to before heating at 1200° C. is preferably 93% or more, and more preferably 95% or more.

On the other hand, the strength of the honeycomb structure of the first comparative example prepared without using the sintering assistant was insufficient. This is considered to be because sintering of the inorganic binder without the sintering assistant was insufficient at the low temperature of 1050° C. and the strength of the honeycomb structure decreased. In each of the honeycomb structures of the second and third comparative examples, the ratio of the specific surface area was under 90%. This means that sintering of the honeycomb structure excessively progressed. As shown in Table 1, such a honeycomb structure had an insufficient specific surface area. In the second comparative example, sintering of not only a binder phase but also promoter particles excessively progressed due to the

TABLE 1

| Examples and Comparative Examples No. | Promoter Particles [parts by mass] | | Inorganic Binder (Solid Content) [parts by mass] | Sintering Assistant (Oxide Equivalent Amount) [parts by mass] | Sintering temperature [° C.] | Specific Surface $A_0$ [m$^2$/g] | $\Delta A$ of Specific Surface [%] | Strength [MPa] |
|---|---|---|---|---|---|---|---|---|
| | First Promoter Particles | Second Promoter Particles | | | | | | |
| First Example | 70 | 30 | 10 | 0.35 | 1050 | 30 | 93.7 | 68 |
| Second Example | 70 | 30 | 5 | 0.35 | 1050 | 33.5 | 94.3 | 49 |
| Third Example | 70 | 30 | 15 | 0.35 | 1050 | 29 | 90.3 | 76 |
| Fourth Example | 70 | 30 | 10 | 0.7 | 1050 | 25 | 95.2 | 73 |
| Fifth Example | 70 | 30 | 10 | 1.4 | 1050 | 21 | 96.7 | 81 |
| First Comparative Example | 70 | 30 | 10 | — | 1050 | 31.6 | 97.8 | 28 |
| Second Comparative Example | 70 | 30 | 10 | — | 1150 | 9.5 | 66.3 | 50 |
| Third Comparative Example | 70 | 30 | 10 | 2.8 | 1050 | 6.5 | 80.0 | 107 |

As can be seen from Table 1, each of the honeycomb structures of the examples maintained almost the same specific surface area as that of each comparative example, but exhibited significantly higher strength than that of each comparative example. This is because each honeycomb structure of the example used a sintering assistant in the mixing step, and was sintered at a low temperature of 1100° C. or less in the sintering step. That is, because decomposition of the inorganic binder materials were sufficiently progressed by the sintering assistant even at a low temperature, a binder phase 3 having high strength was formed. With the formation of the binder phase 3 and due to the low temperature sintering, progress of sintering of promoter particles 2 (first promoter particles 21 and second promoter particles 22) was suppressed, thereby minimizing decrease of the specific surface area. Therefore, the honeycomb structure 1 of the embodiment had the specific surface area and strength larger than a given level described above.

As shown in Table 1, in the honeycomb structures 1 of the examples obtained by the above method, a ratio of the excessively high sintering temperature. This is considered to be the reason why the specific surface area was insufficient as described above. In the third comparative example, sintering of not only a binder phase but also promoter particles excessively progressed due to the excessive addition amount of the sintering assistant, in spite of the relative low temperature sintering. This is considered to be the reason why the specific surface area was insufficient as described above.

As shown in FIG. 2, in the honeycomb structure 1 of the present example, each promoter particle 2 includes the first promoter particle 21 made of a ceria-zirconia solid solution and the second promoter particle 22 made of θ-alumina. In such a case, the specific surface area and the strength of the honeycomb structure 1 may be increased even more. This is because the second promoter particles 22 made of θ-alumina have a high specific surface area and have excellent bondability to the binder phase 3 formed of the inorganic binder particles made of α-alumina. In the present example, although the second promoter particles 22 made of θ-alumina were used, use of second promoter particles made of γ-alumina in lieu of θ-alumina may also obtain the same effects. In the honeycomb structure 1, the crystal structure of alumina (θ-alumina and/or γ-alumina) of the second promoter particles 22 can be adjusted by changing the sintering temperature. The honeycomb structure of the present example was sintered at the low temperature as described above, thereby minimizing decomposition of promoter particles made of θ-alumina and/or γ-alumina, and thereby maintaining the high specific surface area.

As described above, the honeycomb structure is preferably sintered at 1100° C. or less. In such a case, sintering of the promoter particles 2 can be reduced, and a honeycomb structure can be prepared, which has the ratio of the specific surface area being 90% or more, after heating to before heating at 1200° C. The sintering temperature is more preferably 1050° C. or less. From a view point that otherwise progress of sintering of the inorganic binder particles is insufficient, and the strength of the honeycomb structure may be reduced, the sintering temperature is preferably 900° C. or more.

The addition amount of the sintering assistant solution relative to 100 parts by mass of promoter particles is preferably 1.4 parts by mass or less in terms of the amount of oxide. In such a case, progress of sintering of the promoter particles is reduced, but sintering of the inorganic binders can be permitted to progress to assist decomposition. Thus, the honeycomb structure can be prepared, which has the ratio of the specific surface area being 90% or more, after heating to before heating at 1200° C. The addition amount of the sintering assistant solution relative to 100 parts by mass of promoter particles is more preferably 0.7 parts by mass or less in terms of the amount of oxide. From the view point of sufficiently obtaining the effect of adding the sintering assistant solution, the addition amount of the sintering assistant solution relative to 100 parts by mass of promoter particles is preferably 0.35 parts by mass or more in terms of the amount of oxide.

In the present example, not only an aqueous solution of iron nitrate but also an aqueous solution of iron sulfate can be used as the sintering assistant solution. At least one of iron nitrate, iron chloride, iron acetate, iron sulfate, ammonium nitrate iron and the like, for example, can be used instead of iron sulfate. Another sintering assistant solution that can be used is an aqueous solution of a chromium sulfate. When using an aqueous solution of a chromium sulfate, chromium can be dissolved in a part of α-alumina in a binder phase made of inorganic binder particles composed of mainly α-alumina. Chromium, when oxidized, forms a corundum structure in a same way as the above-described iron, similar to α-alumina. Accordingly, even when using an aqueous solution of chromium sulfate, the same effect may also be obtained as when using the aqueous solution of the above-described iron sulfate. At least one of chromium chloride, potassium dichromate, barium chromate, calcium chromate and the like, for example, can be used instead of chromium sulfate.

As in the mixing step of the present example, it is preferable that the inorganic binder materials and the sintering assistant solution are blended in advance to prepare the liquid mixture, and the promoter particles are added into the liquid mixture. In this case, the inorganic binder materials made of alumina sol are sufficiently blended with the sintering assistant solution. Thus, in the sintering step, the progress of sintering of the promoter particles is more sufficiently reduced, but sintering of the binder phase can be sufficiently permitted to progress. As a result, the honeycomb structure can have a specific surface area and a strength improved at an even higher level.

The honeycomb structure is used in a flow channel of exhaust gases discharged from an internal combustion engine. The honeycomb structure is preferably used in a temperature environment of not more than the above-described sintering temperature, more preferably at 1000° C. or less, even more preferably 900° C. or less, and most preferably 850° C. or less. In this case, it is possible to prevent the specific surface area of the honeycomb structure from reducing in a temperature environment where the honeycomb structure is used.

From a view point of sufficiently obtaining performance of purifying exhaust gases, the specific surface area of the honeycomb structure is preferably 10 $m^2/g$ or more. The above-described specific surface area refers to a BET specific surface area of a honeycomb structure obtained after being sintered, that is, a specific surface area measured without being heated at 1200° C. The specific surface area of the honeycomb structure is more preferably 20 $m^2/g$ or more, and even more preferably 30 $m^2/g$ or more.

From a view point of preventing damage, a strength of a honeycomb structure used being installed in vehicles is preferably 30 MPa or more, more preferably 45 MPa or more, and even more preferably 60 MPa or more.

Sixth to Tenth Examples

Figure 3:
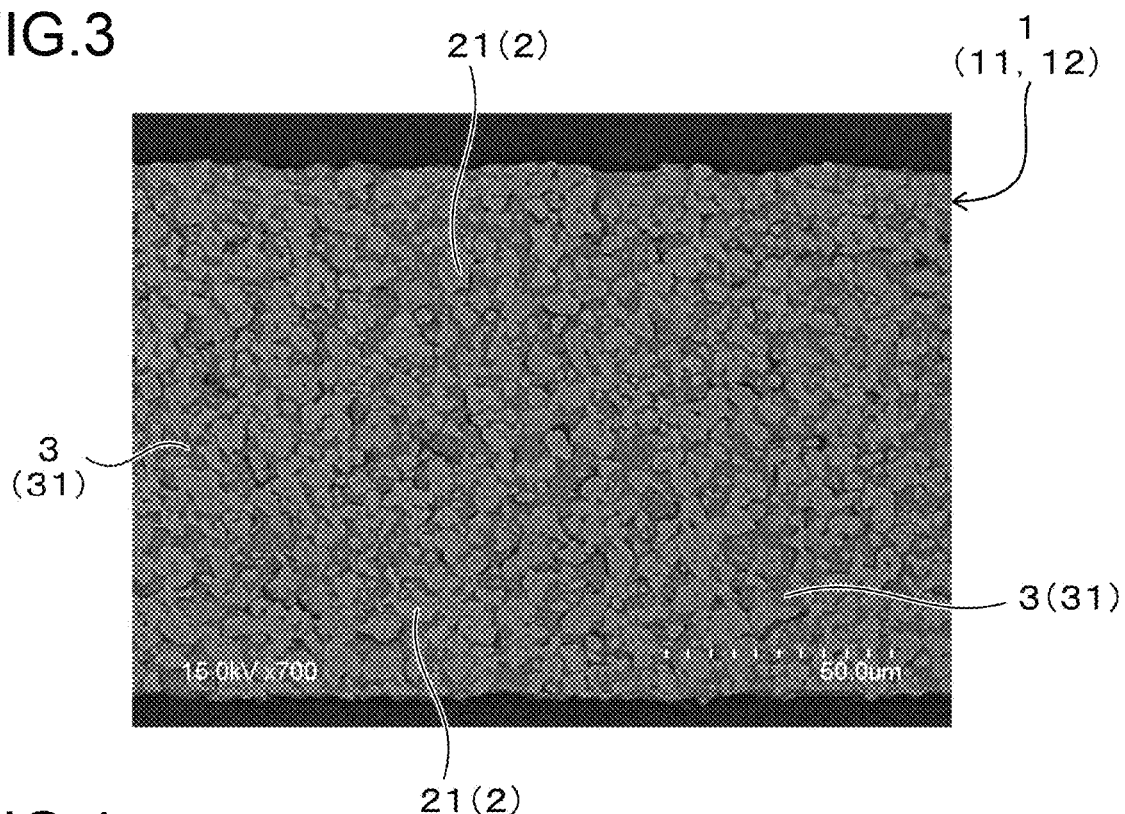
FIG. 3 shows an image of a cross section of a honeycomb structure manufactured under conditions of a sixth embodiment acquired by an electron scanning microscope.

Hereinafter, a description will be given of an example of a honeycomb structure prepared by using only the first promoter particles made of a ceria-zirconia solid solution as promoter particles, without using the second promoter particles made of alumina. In a sixth example, a honeycomb structure was prepared in the same way as in the first example, except that the addition amount of the first promoter particles was changed to 100 parts by mass without using the second promoter particles and that the sintering temperature was changed to 1000° C. FIG. 3 shows an image of a cross section of the honeycomb structure of the sixth example acquired using the SEM.

As shown in FIG. 3, the honeycomb structure 1 of the sixth example included the first promoter particles 21 as the promoter particles 2, but did not include the second promoter particles 22. The first promoter particles 21 were made of a ceria-zirconia solid solution. The second promoter particles 22 were made of alumina as used in the first to fifth examples. The rest of the configuration was the same as the first example, that is, the binder phase 3 interposed between the promoter particles 2 was an aggregation of a number of fine inorganic binder particles 31 containing α-alumina as a main component.

The amounts of materials of honeycomb structures used in the following examples and comparative examples are each expressed in terms of parts by mass relative to 100 parts by mass of the first promoter particles.

In a seventh example, a honeycomb structure was prepared in the same way as in the sixth example, except that the blending ratio of the inorganic binder material was changed to 5 parts by mass in terms of solid content.

In an eighth example, a honeycomb structure was prepared in the same way as in the sixth example, except that the blending ratio of the inorganic binder materials was changed to 15 parts by mass in terms of solid content.

In a ninth example, a honeycomb structure was prepared in the same way as in the sixth example, except that the blending ratio of the sintering assistant was changed to 0.7 parts by mass in terms of oxide equivalent amount.

In a tenth example, a honeycomb structure was prepared in the same way as in the sixth example, except that the blending ratio of the sintering assistant was changed to 1.4 parts by mass in terms of oxide equivalent amount.

In each of the sixth to tenth examples, a specific surface area $A_0$, a changing rate $\Delta A$ of the specific surface area and a strength were measured in the same way as in the first example. The results are shown in Table 2.

Fourth to Sixth Comparative Examples

In a fourth comparative example, a honeycomb structure was prepared in the same way as in the sixth example, except that no sintering assistant solution was used.

In a fifth comparative example, a honeycomb structure was prepared in the same way as in the first example, except that no sintering assistant solution was used and that the sintering temperature was changed to 1150° C.

In a sixth comparative example, a honeycomb structure was prepared in the same way as in the first example, except that the addition amount of the sintering assistant solution relative to 100 parts by mass of promoter particles was changed to 2.8 parts by mass in terms of oxide ($Fe_2O_3$) equivalent amount.

In each of the fourth to sixth comparative examples, a specific surface area $A_0$, a changing rate $\Delta A$ of the specific surface area, and a strength were measured. The results are shown in Table 2.

Comparison of Sixth to Tenth Examples with Fourth to Sixth Comparative Examples

For each of honeycomb structures of the examples and the comparative examples, formulation of materials and sintering conditions when manufactured, and evaluations are shown in Table 2.

promoter particles 2 was suppressed, thereby minimizing decrease of the specific surface area. Therefore, the honeycomb structure 1 of each of the sixth to tenth examples had a specific surface area and a strength larger than a given level described above.

In the honeycomb structure 1 of each of the sixth to tenth example obtained by the above method, changing rate of the specific surface area before and after heating at 1200° C. was 90% or more, similarly to the first to fifth examples. This means that the honeycomb structure 1 was sintered at the low temperature as described above. With such a low sintering temperature, the binder phase 3 was sufficiently sintered in the presence of the Fe and, coupled with the thermal decomposition of alumina of the binder phase, caused mutual bonding of the promoter particles 2 with sufficiently high strength. On the other hand, since sintering of the promoter particles was suppressed by the low temperature sintering, decrease of the specific surface area of the honeycomb structures was minimized. Preferable embodiments of the sixth to tenth examples of the honeycomb structures are similar to those of the first to fifth examples.

On the other hand, the strength of the honeycomb structure of the fourth comparative example prepared without using the sintering assistant was insufficient. This is considered to be because sintering of the inorganic binder without the sintering assistant was insufficient at the low temperature of 1000° C. and the strength of the honeycomb structure decreased.

In each of the honeycomb structures of the fifth and sixth comparative examples, the changing rate of the specific

TABLE 2

| Examples and Comparative Examples No. | Promoter Particles [parts by mass] | | Inorganic Binder (Solid Content) [parts by mass] | Sintering Assistant (Oxide Equivalent Amount) [parts by mass] | Sintering temperature [° C.] | Specific Surface $A_0$ [m²/g] | Changing Rate | Strength [Mpa] |
|---|---|---|---|---|---|---|---|---|
| | First Promoter Particles | Second Promoter Particles | | | | | $\Delta A$ of Specific Surface [%] | |
| Sixth Example | 100 | — | 10 | 0.35 | 1000 | 19.5 | 96.3 | 37 |
| Seventh Example | 100 | — | 5 | 0.35 | 1000 | 20.4 | 95.1 | 31 |
| Eighth Example | 100 | — | 15 | 0.35 | 1000 | 17.5 | 94.3 | 47 |
| Ninth Example | 100 | — | 10 | 0.7 | 1000 | 12 | 91.7 | 44 |
| Tenth Example | 100 | — | 10 | 1.4 | 1000 | 10.8 | 90.7 | 60 |
| Fourth Comparative Example | 100 | — | 10 | — | 1000 | 20.2 | 95 | 17 |
| Fifth Comparative Example | 100 | — | 10 | — | 1150 | 6.1 | 82 | 55 |
| Sixth Comparative Example | 100 | — | 10 | 2.8 | 1000 | 4.2 | 81.0 | 72 |

As can be seen from Table 2, each of the honeycomb structures of the sixth to tenth examples maintained almost the same specific surface area as that of each comparative example, but exhibited sufficiently higher strength than that of each comparative example. This is because each of the honeycomb structures of the sixth to tenth examples used the sintering assistant in the mixing step, and was sintered at the low temperature of 1100° C. or less in the sintering step, similarly to the first to fifth examples. That is, because decomposition of the inorganic binder materials was sufficiently progressed by the sintering assistant even at the low temperature, the binder phase 3 having high strength was formed. With the formation of the binder phase 3 and due to the low temperature sintering, progress of sintering of the surface area was under 90%. This means that sintering of the honeycomb structure excessively progressed. As shown in Table 2, such a honeycomb structure had an insufficient specific surface area. In the fifth example, sintering of not only a binder phase but also promoter particles excessively progressed due to the excessively high sintering temperature. This is considered to be the reason why the specific surface area was insufficient as described above. On the other hand, in the sixth comparative example, the addition amount of the sintering assistant was excessive. Thus, sintering of not only a binder phase but also promoter particles excessively progressed, in spite of the relative low temperature sintering. This is considered to be the reason why the specific surface area was insufficient as described above.

Example

The present example is an example to examine a change of a crystal structure when an inorganic binder material made of alumina sol is sintered at different sintering temperature conditions.

A liquid mixture was prepared by mixing an inorganic binder material made of alumina sol (AS520 manufactured by Nissan Chemical Industries, Limited) with a sintering assistant solution made of an aqueous solution of an iron sulfate (II). Then, the inorganic binder materials and the sintering assistant solution were mixed so that an amount of Fe relative to 10 parts by mass in terms of solid content of alumina sol was 0.35 parts by mass in terms of oxide equivalent amount. This blending ratio was similar to the first example. Then, water in the liquid mixture was evaporated, thereby obtaining a solid. The obtained solid was sintered in an electric furnace. The sintering was performed by increasing the temperature in the electric furnace at a rate of 200° C./h, and maintaining the temperature at 1000° C. for 20 hours, followed by cooling. The obtained sinter is referred to as a "sample X1".

Another sinter was prepared similarly to the sample X1, except that no sintering assistant solution was added. The obtained sinter is referred to as a "sample X2". The sample X2 is a sinter of alumina sol prepared without adding the sintering assistant solution.

Then, the samples X1 and X2 were subjected to X-ray diffraction pattern measurement. Specifically, the samples X1 and X2 were pulverized using a mortar, thereby obtaining respective pulverized powders. The pulverized powders were each subjected to powder X-ray diffraction using an X-ray diffractometer ("SmartLab" manufactured by Rigaku Corporation), to measure X-ray diffraction patterns. The measurements were performed under conditions of X-ray source: Cu-Kα ray, measurement range: 20 to 70°, scan width: 0.01°, acceleration voltage: 40 kV, and current: 30 mA. The results are shown in FIG. 4.

Figure 4:
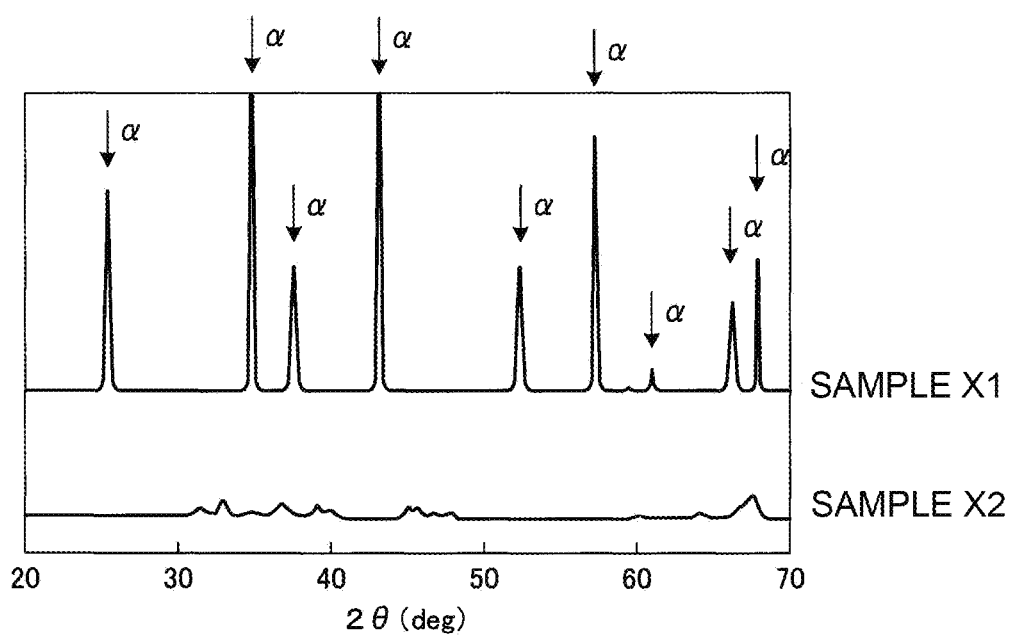
FIG. 4 shows X-ray diffraction patterns of sinter (specifically, samples X1 and X2) manufactured under conditions of an example of experiment.

As will be understood from FIG. 4, peaks derived from α-alumina as indicated by the arrows a were observed in the X-ray diffraction pattern of the sample X1. On the other hand, in the X-ray diffraction pattern of the sample X2, no peak derived from α-alumina was observed. This means that use of the sintering assistant solution, such as the aqueous solution of the iron sulfate (II), allowed easy progress of decomposition of the inorganic binder materials made of alumina sol as in the sample X1. For example, this means that α-alumina with superior strength was generated even at the low temperature of 1000° C. in the sample X1. On the other hand, in the sample X2, weak peaks derived from γ-alumina and θ-alumina were partially observed; however, the peaks derived from α-alumina were hardly observed.

Figure 5:
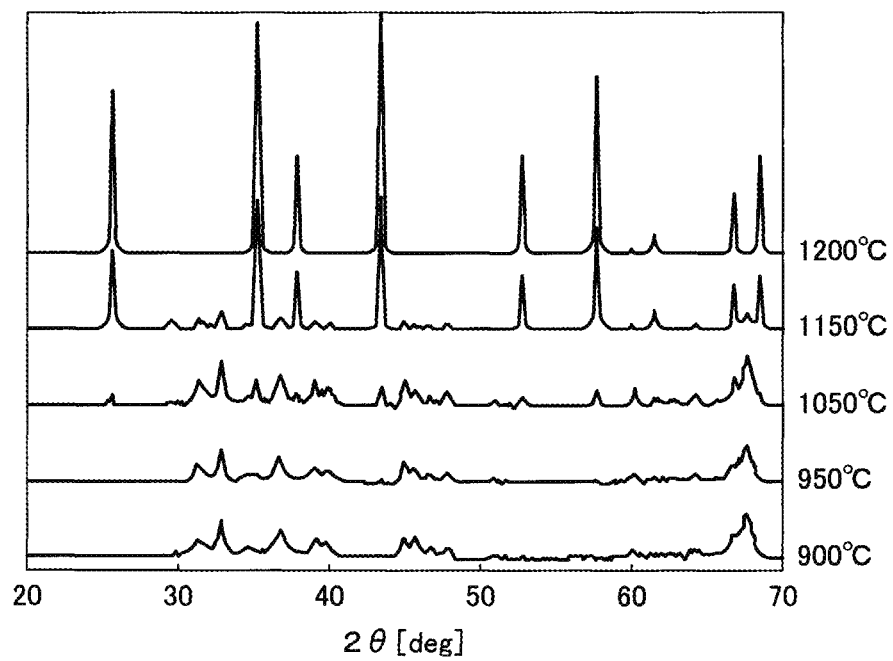
FIG. 5 shows X-ray diffraction patterns of a sinter product of alumina sol manufactured at different sintering temperatures in the example of experiment.

FIG. 5 shows X-ray diffraction patterns of a sinter obtained by sintering alumina sol at different sintering temperatures without using the sintering assistant solution, similarly to the sample X2. As will be understood from FIG. 5, peaks derived from γ-alumina and θ-alumina were mixed at sintering temperatures of 900° C. and 950° C. Peaks derived from θ-alumina were present at sintering temperature of 1050° C. Peaks derived from α-alumina and θ-alumina were mixed at sintering temperature of 1150° C. The peaks derived from α-alumina were present at a sintering temperature of 1200° C. Accordingly, it can be seen that decomposition of alumina progressed by the sintering at the temperature of 1150° C. or more without using the sintering assistant, and that alumina was almost completely thermally decomposed by the sintering at the temperature of 1200° C. or more. Accordingly, in the case that the first promoter particles made of the ceria-zirconia solid solution are used, together with the second promoter particles made of θ-alumina and/or γ-alumina, decomposition of the second promoter particles can be sufficiently reduced by performing sintering at a temperature of 1100° C. or less as in the first to fifth examples.

REFERENCE SIGNS LIST

1 honeycomb structure
2 promoter particle
21 first promoter particle
22 second promoter particle
3 binder phase

The invention claimed is:

1. A honeycomb structure comprising:
   promoter particles which contain at least first promoter particles made of a ceria-zirconia solid solution; and
   a binder phase in which a number of inorganic binder particles are aggregated with each other, with α-alumina being a main component, the inorganic binder particles interposed between the promoter particles, wherein
   the honeycomb structure is obtained by sintering at a temperature of 1100° C. or less
   the binder phase contain Fe and/or Cr dissolved in α-alumina; and
   the honeycomb structure has a specific surface area at a ratio of 90% or more after heating to before heating at 1200° C. for 20 hours.

2. The honeycomb structure as set forth in claim 1, wherein,
   the promoter particles contain second promoter particles made of one or two of γ-alumina and θ-alumina.

3. A manufacturing method of the honeycomb structure as set forth in claim 1 comprising:
   a mixing step of obtaining a clay by mixing at least the promoter particles, an inorganic binder material made of alumina sol, and a sintering assistant solution that is an aqueous solution of one or two of an Fe salt and a Cr salt, the promoter particles containing at least the first promoter particles made of a ceria-zirconia solid solution; and
   a molding step of obtaining a molding by molding the clay into a honeycomb shape;
   a sintering step of sintering the molding at a temperature of 1100° C. or less, wherein
   in the mixing step, the sintering assistant solution is added so that an addition amount of one or two of Fe and Cr are 1.4 parts by mass or less in terms of an amount of oxide, relative to 100 parts by mass of the promoter particles.

4. The manufacturing method of the honeycomb structure as set forth in claim 3, wherein,
   in the mixing step, a liquid mixture is prepared by mixing the inorganic binder material and the sintering assistant solution in advance; and
   the promoter particles are added to the liquid mixture.

\* \* \* \* \*